United States Patent
Bakewell

[11] 3,722,834
[45] Mar. 27, 1973

[54] DOUGH MIXING MACHINE

[76] Inventor: Sidney Bakewell, 5945 Martin Ave., Dearborn, Mich. 48210

[22] Filed: Jan. 20, 1972

[21] Appl. No.: 219,345

[52] U.S. Cl. ................................................. 259/105
[51] Int. Cl. ............................................... B01f 7/08
[58] Field of Search...... 259/105, 185, 186, 6, 21, 41, 259/65, 120

[56] References Cited

UNITED STATES PATENTS

| 1,392,446 | 10/1921 | Pinkney | 259/105 |
| 1,426,984 | 8/1922 | Guldbech | 259/105 |
| 2,784,950 | 3/1957 | Bakewell | 259/105 |
| 2,784,951 | 3/1957 | Bakewell | 259/105 |

Primary Examiner—Robert W. Jenkins
Attorney—Robert A. Sloman

[57] ABSTRACT

In a dough mixer having a frame, a tank, a power transmission driving a sleeve and a coaxial shaft, both projecting through one end wall of the tank, the improvement which includes a longitudinally adjustable idler shaft spaced from and aligned with the power driven shaft and extending through the other tank wall. An outer paddle assembly nests within the tank and at one end is secured to said drive shaft sleeve and at its other end is journalled upon the idler shaft. An inner paddle assembly rotates within the outer paddle assembly, at one end is secured to the drive shaft and at its opposite end is journalled upon the idler shaft and wherein, the inner paddle assembly is easily removable from the tank for cleaning by removing the two retainer nuts and upon axial retraction of the idler shaft sufficient to disengage from the inner paddle assembly to permit disengagement of the inner paddle assembly from the drive shaft.

7 Claims, 2 Drawing Figures

PATENTED MAR 27 1973 3,722,834

DOUGH MIXING MACHINE

BACKGROUND OF THE INVENTION

Heretofore in dough mixing machines within a suitable tank rockably mounted upon a framework, there have been provided therein coaxially mounted inner and outer paddle assemblies and wherein, the existance of a central drive shaft extending through the tank caused undesired tangling of the dough therearound. In the earlier U.S. Pats. No. 2,784,950 and No. 2,784,951, entitled mixing machines, this problem would arise if they were used for mixing dough.

It is therefore an object of the present invention to provide an improved mounting for the two paddle assemblies by which the one ends of the inner and outer paddle assemblies are journalled upon and secured to an idler shaft which is longitudinally spaced from the drive shaft in such a manner that by longitudinal retraction of the idler shaft, the inner paddle assembly may be disengaged and removed without disturbing the outer paddle assembly.

These and other objects will be seen from the following specification and claims in conjunction with the appended drawing in which:

DETAILED DESCRIPTION OF THE INVENTION

The present dough mixer generally indicated at 12 includes frame 14 with upright end supports 16 and 18 respectively mounting bearing blocks 20.

Figure 2:
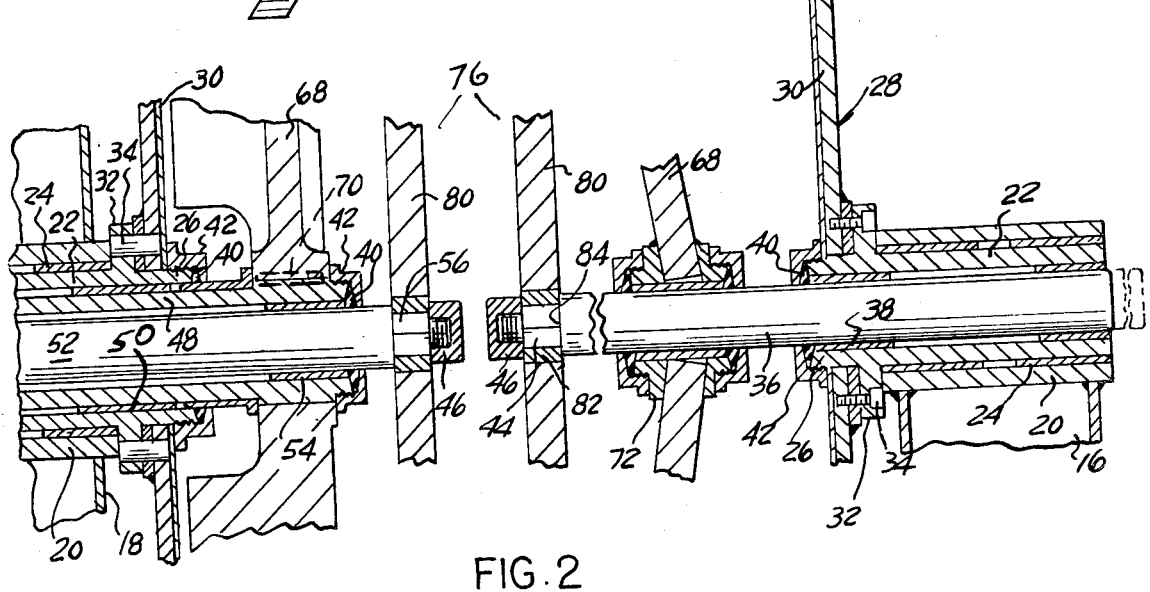
FIG. 2 is a fragmentary partly broken away longitudinal section illustrating the mounting of the inner and outer paddle assemblies.

A pair of longitudinally spaced sleeves 22, FIG. 2 project through said bearing blocks with suitable bushings 24 interposed. Each sleeve includes a threaded portion 26 which respectively projects through the end walls 30 of tank 28. Each sleeve includes annular flange 32 which bears against the outer surface of said end walls and is suitably secured thereto by fasteners 34.

Idler shaft 36 is journalled through one sleeve 22 upon the right side of the assembly with bushings 38 interposed.

Nylon or other plastic seal 40 upon the interior of the tank is mounted upon idler shaft 36, bears against the threaded inner end of sleeve 22 and is secured in position by retainer nut 42 threaded onto said sleeve. The inner end portion of idler shaft 36 is square as at 44, and its threaded end receives retaining blind nut 46.

A similar sleeve 22, FIG. 2, is journalled within the other bearing block 20 upon the opposite side of the tank 28 with suitable bushings 24 interposed. This sleeve also has a threaded portion 26 which extends through corresponding wall 30 of said tank to receive retainer nut 42 for seal 40 which bears against the inner end of sleeve 22.

Power rotated drive sleeve 48 is journalled through sleeve 22 with suitable bushings 50 interposed, and extends through adjacent end wall 30 of said tank and partly into the interior thereof.

Power rotated drive shaft 52 is axially disposed within drive sleeve 48 with suitable bushings 54 interposed. Said drive shaft extends through the corresponding end wall 30 of said tank and outwardly of said power rotated sleeve.

Figure 1:
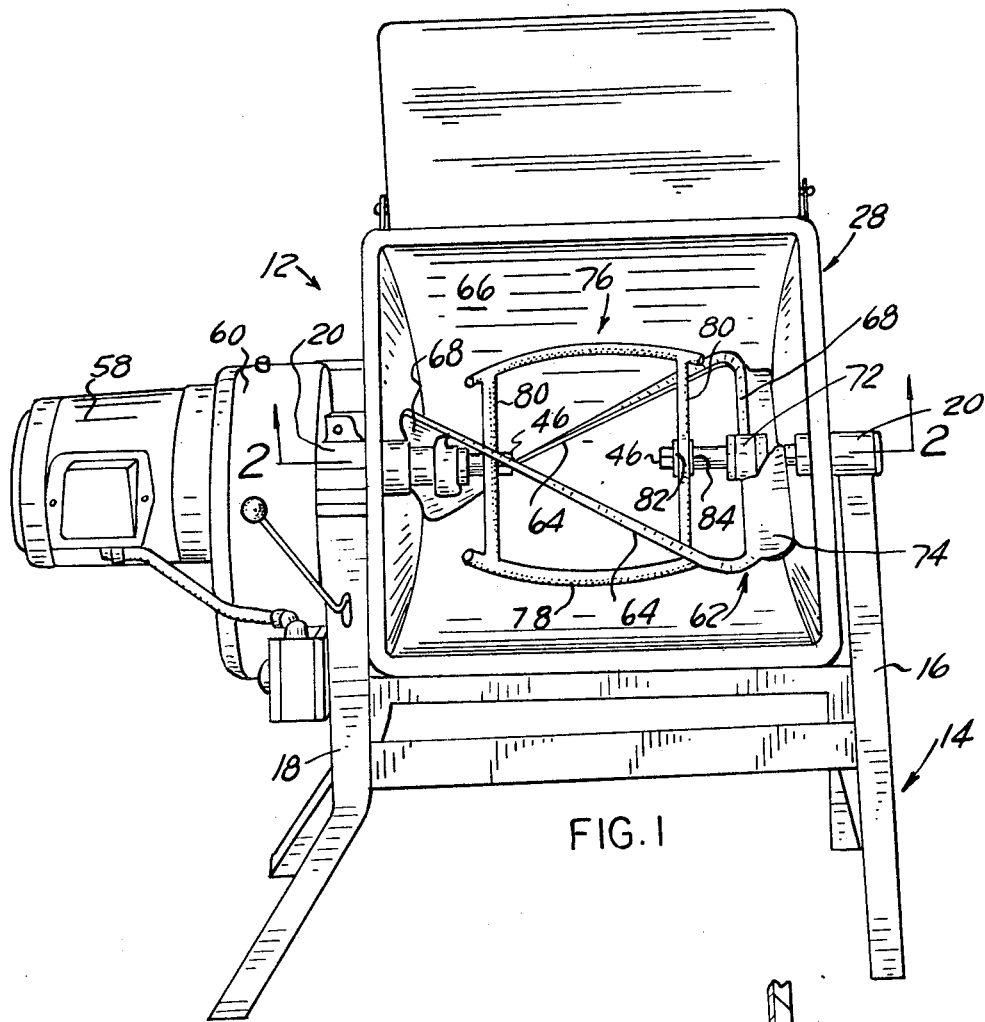
FIG. 1 is a perspective view of the present dough mixing machine.

As viewed in FIG. 1, motor 58 is suitably mounted upon frame 14 and includes output mechanism which drivingly engages suitable conventional transmission 60 for delivering power drive in one direction to drive sleeve 48, and power drive in the opposite direction to drive shaft 52.

The internal gearing connections and mechanism of the transmission form no part of the present invention except for the fact that power driven sleeve 48 rotates in one direction and power drive shaft 50 rotates in the opposite direction. Accordingly, a detailed description of the transmission is omitted.

Rotatably nested within tank 28 is an outer paddle assembly 62 which includes a pair of spiral shaped spaced opposed longitudinally extending blades 64 which are normally positioned so as to be inwardly of and parallel to tank wall 66.

Outer paddle assembly includes left end support 68 which connects the one ends of spiral blades 64 and is centrally mounted as in FIG. 2 on power driven sleeve 48 and keyed thereto at 70. Its opposite transverse end support 68 interconnects the other ends of the spiral blades 64 and has a centrally apertured hub 72 journalled over and around idler shaft 36 inwardly of the adjacent tank wall.

The transverse elongated wiper blade 74 is secured to and extends laterally of end support 68 and is adapted to rotate adjacent the corresponding tank end wall, FIG. 1.

The inner paddle assembly 76 is nested within the outer paddle assembly 62 and is adapted for rotation in the opposite direction to the outer paddle assembly, being mounted coaxially thereof.

The inner paddle assembly includes a pair of spirally curved rod blades 78 of circular cross section. The inner paddle assembly includes adjacent the ends of the respective rod blades a pair of longitudinally spaced end supports 80. These have central hubs 82 with square apertures therethrough which respectively receive squared end 56 of power drive shaft 52 as well as the squared end 44 of idler shaft 136. Blind nuts 46 are threaded over the outer threaded ends of shafts 36 and 52 and tightly engage end support 80. Idler shaft 36 and drive shaft 52 include retaining shoulders 84 adjacent their squared end portions for cooperative retaining registry with the corresponding end support 80 of the inner paddle assembly.

OPERATION

In the present construction, the tank end walls 30 are fixedly secured to the corresponding sleeves 22 and these are journalled through the corresponding bearing blocks 20 of the mixer frame. Thus, limited tilting of the tank is provided for. A suitable cover for the tank may be employed if desired, as shown in FIG. 1.

The idler shaft 36 which is axially in alignment with the power drive shaft 52, is longitudinally spaced therefrom so as to provide an open area within the inner paddle assembly.

On removal of nuts 46 of the idler shaft 36 may be retracted longitudinally to provide a means for disengaging said shaft from one end support 80 of the inner paddle assembly. With the idler shaft 36 retracted outwardly and disengaged from said end support, the entire inner paddle assembly may be translated longitudinally in the same direction until its other end support 80 is disengaged from power driven shaft 52. Thus, the inner paddle assembly may be easily disengaged and removed from the tank without disturbing the mounting of the outer paddle assembly 62, merely by removing the two blind nuts 46.

This provision is made because of government regulations which require the removal of the inner paddle assembly for cleaning purposes since it is less accessible for cleaning than the outer paddle assembly which need not be removed for cleaning.

The mounting of the respective sleeves 22 with their threaded shanks 26 extending through the corresponding end walls of the tank provides a convenient means for mounting and securing the plastic seals 40 through the threaded retainers 42 as shown in FIG. 2. The tank, the shafts and sleeves and paddle assemblies are made from stainless steel for improved cleanliness in order to comply with federal regulations.

Having described my invention, reference should now be had to the following claims.

I claim:

1. In a dough mixer having a frame, a tank with end walls pivotally supported on the frame; a power operated transmission on the frame; a power rotated sleeve connected to the transmission and projected through one end wall of and into the tank; and a power rotated shaft connected to the transmission and projected axially through said sleeve and said tank wall and into said tank; the improvement comprising an idler shaft aligned with the power rotated shaft, journalled on said frame projecting through the other end wall of said tank and partly into said tank; an outer paddle assembly including a pair of opposed spirally shaped mixing blades nested in the tank including one transverse end support keyed upon said drive sleeve and with the other end support centrally journalled upon said idler shaft; and an inner paddle assembly nested and rotatable within the outer paddle assembly and including a pair of opposed spirally shaped mixer rods including one transverse end support centrally secured to said power driven shaft and a second end support centrally secured upon said idler shaft.

2. In the dough mixer of claim 1, spaced bearing blocks on said frame; the mounting of said tank including a pair of aligned spaced sleeves journalled within said bearing blocks respectively, each sleeve including an annular flange secured to a tank side wall, and a tubular seal engaging threaded shank extending through a tank end wall;

said idler shaft journalled through one said sleeve, said power rotated sleeve journalled through the other tank mounting sleeve.

3. In the dough mixer of claim 2, apertured seals on said idler shaft and upon said power rotated sleeve on the interior of said tank mounting sleeves, and seal retainers engaging said seals respectively and threaded onto said threaded shanks.

4. In the dough mixer of claim 1, said idler shaft upon disconnection from said inner paddle assembly, being longitudinally adjustable outwardly and disengageable from one end support of said inner paddle assembly, whereby the inner paddle assembly upon disconnection from said power rotated shaft is longitudinally adjustable to disengage therefrom for removal of said inner paddle assembly without disturbing the outer paddle assembly.

5. In the mixer of claim 1, inner end portions of said power rotated and idler shafts being square with the ends threaded, the mounting of said inner paddle assembly including square apertures extending through the inner paddle assembly end supports receiving said square portions;

and removable blind end nuts on the ends of said shafts retainably engaging said inner paddle assembly end supports.

6. In the mixer of claim 1, said inner paddle assembly mixing rods being circular in cross section.

7. In the mixer of claim 1, the mounting of said other end support of the outer paddle assembly upon said idler shaft including a central hub connected to said other end support, with its opposite ends threaded and receiving said idler shaft;

a sleeve bearing interposed between said shaft and hub; plastic seals on said idler shaft engaging opposite ends of said hub; and seal retainer nuts on said idler shaft threaded onto said hub.

* * * * *